United State
Girard

[11] 3,712,047
[45] Jan. 23, 1973

[54] TIME DISPLAY DEVICE FOR TIMEPIECES

[75] Inventor: Pierre Girard, Bienne, Switzerland

[73] Assignee: Manufacture des Montkes Rolex S. A. Bienne, Bienne (Canton of Berne), Switzerland

[22] Filed: May 11, 1971

[21] Appl. No.: 142,141

[30] Foreign Application Priority Data

May 11, 1970 Switzerland ........................... 6974/70

[52] U.S. Cl .................. 58/50 R, 58/23 R, 58/12.5 R, 350/160 LC
[51] Int. Cl. ........................ G04b 19/30, G04b 19/02
[58] Field of Search .................... 58/23 R, 50 R, 127; 350/160 LC

[56] References Cited

UNITED STATES PATENTS 3,322,485  5/1967  Williams ............................... 350/160
3,505,804  4/1970  Hofstein ............................... 58/50 R
3,593,517  7/1971  Knippler ............................... 58/50 E Primary Examiner—Richard B. Wilkinson
Assistant Examiner—Edith C. Simmons Jackmon
Attorney—Stevens, Davis, Miller & Mosher

[57] ABSTRACT

The time display is ensured by the electrooptic effect of a cell which comprises a liquid crystal layer sandwiched between two solid plates carrying electrodes. The contrast between the neutral areas and those submitted to dynamic scattering by an electric field is enhanced by light rays which are caused to cross the cell from the rear to the front. A lamp arranged behind the cell can produce such rays. The rear electrode is then made transparent or at least semitransparent.

3 Claims, 3 Drawing Figures

TIME DISPLAY DEVICE FOR TIMEPIECES

BACKGROUND OF THE INVENTION

1. Field of the Invention

This invention relates to time display devices for timepieces and in particular to the devices applying the electro-optical effect of liquid crystal cells comprising a liquid crystal layer sandwiched between two solid plates carrying conducting coatings constituting electrodes which are connected to an electronic control device.

2. Description of the Prior Art

For some time those skilled in the art have known that it is possible to use liquid crystals in the manufacture of static elements for displaying a digital or an analogical time indication in timepieces, in particular in electronic timepieces. The liquid crystals used for that purpose are in the form of thin layers sandwiched between two plates carrying electrodes. Normally, i.e., when no electric field is applied to the cell, the liquid crystal layer is as transparent as water. The cell becomes, on the contrary, opaque as soon as a potential is applied to the electrodes. This behavior enables cells to be produced for displaying either an analogical or a digital time indication.

Since the optical activity of the liquids used merely consists in the fact that they become opaque when an electric field is applied thereto and since the contrast between the regions submitted to the field and those which are out of the field only depends on the incident light which illuminates the cell, the production of the desired effect only consumes an extremely small amount of energy.

This behavior in turn enables resorting to liquid crystals for displaying the time indication in independent timepieces of small size such as, for instance, pocket watches or wristwatches. The consumption of energy is indeed small enough so that these timepieces may be supplied by miniature batteries during a sufficiently long time period to render profitable the use of the crystal liquid cells.

However, the time display devices of that type, which have been disclosed and manufactured heretofore, required a strong illumination of the liquid crystal cell in order to obtain a good readable time indication. The contrast between the opaque and transparent regions of the liquid layer then very clearly appears. However, that contrast grows dimmer when the intensity of the light source illuminating the cell decreases. No contrast can even be noticed when the time display device is observed at a relatively dark place. The liquid crystals could therefore not be broadly used heretofore in timepieces such as wrist-watches or pocket watches.

SUMMARY OF THE INVENTION

It is therefore an object of the invention to provide a time display device of the type indicated above, in which the contrast between the energized and not energized regions of the liquid crystal is strong enough for a good reading, even when the timepiece is only weakly illuminated by the incident light.

With the time display device according to the invention the plates sandwiching the liquid crystal layer and the electrodes carried by those plates are transparent at least in part and the device, moreover, comprises a light reflecting or emitting means, which is arranged behind the liquid crystal cell.

In a preferred embodiment of the invention the solid rear plate of the cell is made translucent and a source of light is arranged behind that plate.

BRIEF DESCRIPTION OF THE DRAWING

Two embodiments of the time display device according to the invention are represented diagrammatically and by way of example in the accompanying drawing.

In the drawing.

DESCRIPTION OF THE PREFERRED EMBODIMENTS

Figure 1:
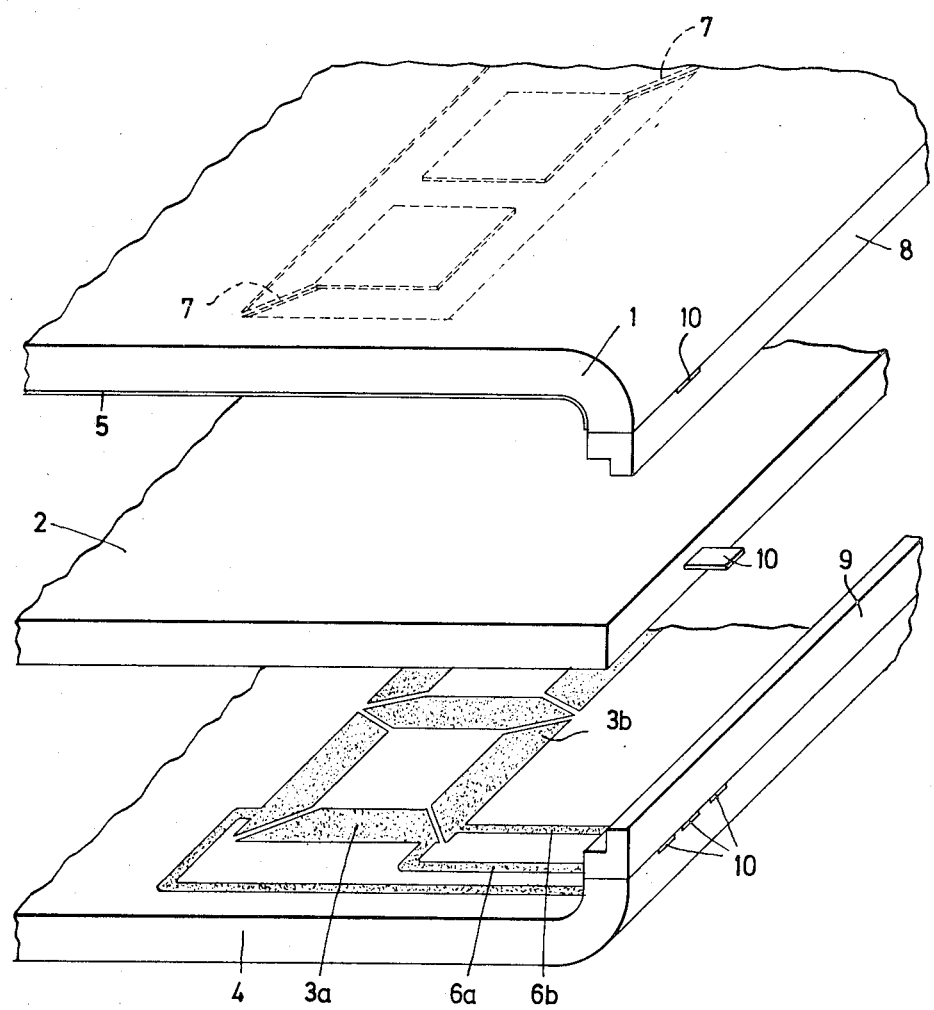
FIG. 1 is a partial exploded perspective view of the first embodiment.

FIG. 1 shows a portion of a cell provided for displaying a complete time indication. The electrode segments 3a, 3b, etc. of the cell portion shown in FIG. 1 are arranged so as to enable displaying any one of the digits from 0 to 9 upon applying a predetermined potential through conductors 6a, 6b, etc. to some of the segments represented. The segments 3 are coated on the lower rear plate 4 of the cell. Plate 4 carries the device and constitutes the bottom of the cell. The peripheral area of this plate is bent upwards. Plate 4 is located opposite an intermediate plate 2, the front and the rear face of which each is provided with a conducting coating constituting a second electrode. This second electrode may be constituted either by a thin coating covering the whole surface of the plate or by a net of threads being thin enough in order to remain invisible. If these threads are close to each other, they produce the same effect as a homogeneous coating covering the whole plate. The double cell represented in FIG. 1 further comprises a front upper plate 1 similar to plate 4. However, the rear inner face of plate 1 is covered by a transparent metallic coating 5, which extends over the whole surface of plate 1 with the exception of areas corresponding to segments 3.

To obtain the desired structure coating 5 is firstly provided on the entire rear face of plate 1 and then removed from all the portions of this plate, which are opposite segments 3. Two narrow tongues 7 are, however, left. They electrically interconnect the areas of coating 5 enclosed by the loops of the eight and the remaining areas of coating 5. It should be understood that coating 5 is provided with as many openings like that represented in FIG. 1 as the time indication to be displayed comprises digits.

Figure 2:
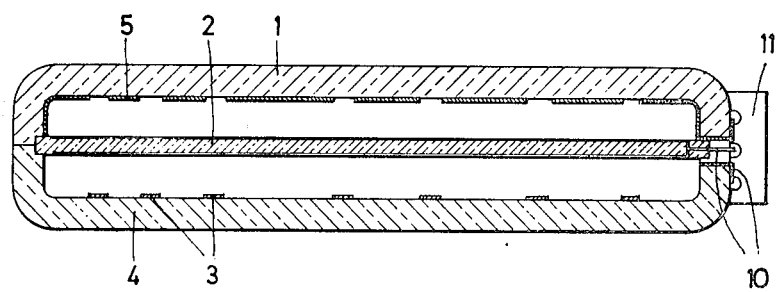
FIG. 2 is a sectional view on a reduced scale of the device of FIG. 1.

The cell described is tightly closed by means of spacers 8 and 9 as well as by means of end walls (not shown). The terminals 10 are provided in such a manner that they can easily be connected to a control unit, which may consist of an integrated circuit emitting the impulsions required for displaying the time indication. This electronic unit is diagrammatically represented at 11 in FIG. 2, which is a longitudinal sectional view of a cell capable of displaying three digits.

The device disclosed hereabove operates as follows:

The middle electrode constituted by the intermediate plate 2 may be considered as an electrode of reference. A constant potential is applied thereto. Moreover, a constant potential, which differs from that of electrode 2, can similarly be applied to electrode 5, so that the whole area of the dial, with the exception of the portions in which the digits are displayed, appears opaque and gives the dial its ground appearance. As regards segments 3, some of them, i.e., those which do not participate in the formation of the digit to be displayed, are set by the electronic control unit 11 to a potential which differs from that of the intermediate plate 2. Accordingly, the liquid portions comprised between the electrodes 2 and 3 becomes opaque opposite the segments in question of electrode 3, while the remaining liquid portions comprised between these electrodes are transparent.

It appears from the foregoing description that the segments 3, which form the digits to be displayed, are the only areas of the front surface of rear plate 4 which are not covered by an opaque liquid portion either of the layer sandwiched between plates 1 and 2 or of the layer sandwiched between plates 2 and 4. The digits themselves are thus visible because the light illuminating the cell is reflected by the segments 3 forming the digits to be displayed.

Tests have shown that the structure disclosed displays the digits in a sharper and accordingly more easily readable manner than a cell comprising a single layer of liquid crystal.

The electrodes 3 can be either opaque or semitransparent, or even transparent. In the first instance, the segments 3 forming the digits to be displayed are directly visible through both layers of liquid crystal. Since these segments have a metallic appearance, they establish a strong contrast with the surrounding areas submitted to the dynamic scattering produced within the liquid crystal by the electric field applied thereto. In the second instance, i.e., when segments 3a are semitransparent, the cell behavior is the same as in the first instance when the incident light illuminating the cell is sufficient. One or more lamps can, however, be arranged behind the cell for rendering luminous the digits to be displayed as soon as the incident light becomes too weak. Finally, in the third instance, i.e., when the segments 3 are transparent, a background either reflecting or absorbing will have to be provided behind the cell. The displayed digits will then appear either with a metallic glance or in different colors, or in black on the clearer background of the dial. To obtain good readable displayed digits in the dark, one or more lamps can be arranged at the periphery of the cell and in front of the latter in order to illuminate the visible segments 3.

This arrangement enables, on the one hand, completely hiding the conductors connecting the electrodes to the control unit and, on the other hand, displaying time indications which have a sharp contour. A similar result could also be obtained by replacing the front liquid crystal layer by a thin frosted glass plate having, however, transparent eight-shaped areas. The disclosed structure also enables modifying at will the appearance of the digits which are displayed. A mere change of the program of the control device can indeed have as a result that the displayed digits become opaque while the other areas of the cell remain transparent. This result is obtained by applying the same potential to the electrodes 2 and 5, and a different DC or AC potential to the segments 3 which have to constitute the digits or the letters to be displayed.

Figure 3:
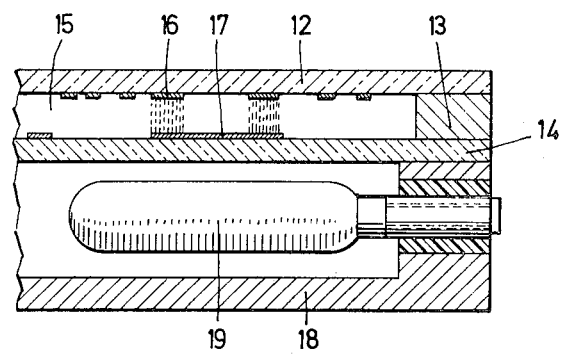
FIG. 3 is a part sectional view of the second embodiment.

When the device described is mounted in a clock, the latter can easily be provided with a photocell or any other photosensitive device that controls a switch provided for automatically switching on the illuminating lamps as soon as the incident light becomes too weak to permit reading the time. The same arrangement can also be used in the embodiment represented in FIG. 3, in which the time display device only comprises a single layer cell.

In this second embodiment the liquid crystal layer 15 is sandwiched between two glass plates 12 and 14 which are transparent and held in spaced apart relationship by means of spacers 13. The segmentary electrodes 16 provided for displaying the desired indications are carried by the rear face of plate 12 constituting the front upper plate of the device. These electrodes are connected to a decoder similar to device 11 of the first embodiment. The common electrode 17 is provided on the front face of the rear plate 14. All these electrodes are transparent. Those skilled in the art know that it is indeed possible nowadays to coat glass plates with metallic layers which are thin enough in order to be transparent while conducting electricity.

The processes used for that purpose are accordingly not disclosed herein. A cup-shaped supporting piece 18 is arranged behind the unit constituted by plates 12 and 14 and the liquid layer 15. The inner surface of piece 18 is reflecting. Its side walls carry one or more lamps 19. Thus, as soon as the incident light becomes too weak to ensure a good contrast between the excited and the not excited areas of liquid 15, lamp 19 can be switched on so that the digits of the time indication will then clearly appear as opaque areas on the remaining portions of the unit (12, 14, 15) which, being entirely transparent, is strongly illuminated under the action of lamps 19. For a better aesthetic appearance the lamps 19 can be arranged around the cell and hidden by a frame of the time display device. Alternately, plate 14 can also be made of frosted glass in order to obtain a good diffusion of the light of lamp 19. The inner surfaces of piece 18 can, moreover, be coated with metal or glass reflecting layers.

Still further methods of artificially illuminating the cell from the side thereof could also be resorted to. For instance, the rear glass plate 14 could be illuminated from the side thereof. Alternatively, the cell could be illuminated from the side thereof through a window provided in the spacers 13. In these two modifications the rear face of the rear glass plate 14 would advantageously be coated with a dark color such as, for instance, brown, green, black, etc. With such an arrangement the opaque portion of the liquid crystal displaying the desired indication appears clearer than the adjacent areas of the background.

Depending on the sizes of the cell the light illuminating the same can be supplied thereto and distributed at the periphery of the liquid crystal by means of optical fibers. Different colors can also be used for the illuminating light in order to distinguish the different displayed indications from one another.

Glasses or plastics available on the market and being semireflecting or semiopaque can also be used. A judicious use of these different materials permits manufacturing timepieces with the best possible contrast at daylight as well as in the dark, thus ensuring a reliable reading of the indications to be displayed.

To enhance the contrast of the time indication produced by the display device according to the invention one can also resort to an arrangement which produces a three dimensional effect and substantially increases the visibility as well as the aesthetic effect of the display device provided that the relative sizes of its different parts be judiciously chosen. Thus, if, for instance, in a device like that represented in FIG. 3, the rear face of plate 14 is wholly covered by a metallic coating which is not connected to the decoder, but merely constitutes a mirror surface as long as lamps 19 are not switched on, those skilled in the art will understand that the areas of the liquid crystal layer 15, which are made opaque by the application of an electric field through the transparent electrodes 16 and 17, do not appear at the same distance as the dial background, thus producing the three dimensional effect desired.

A three dimensional effect as well as an increase of the contrast can also be obtained by means of a device like that of FIG. 1 if the intermediate plate 2 carries segmentary electrodes to form the time indications to be displayed while electrodes 3 and 5 are common electrodes extending over the whole surface of plates 1 and 4. In such a modification the common electrode carried by plate 4 can be an opaque non reflecting electrode which will afford the background of the visible surface of the display device, not the appearance of a mirror, but that of a plain surface, which will be either white, black or colored.

Still further modifications will appear obvious to those skilled in the art within the scope of the appended claims.

I claim:

1. A time display device for timepieces comprising, in combination, a solid front plate, a solid rear plate, a solid intermediate plate arranged between said front plate and said rear plate, electrodes constituted by conducting coatings being provided on said plates and carried thereby, said plates and said electrodes being transparent at least in part, a first liquid crystal layer sandwiched between said front plate and said intermediate plate, and a second liquid crystal layer sandwiched between said intermediate plate and said rear plate.

2. In the device of claim 1, the electrodes carried by said rear plate being opaque and reflecting.

3. A digital time display device for timepieces comprising, in combination, decoding means, a solid front plate having a front face and a rear face, a transparent electrode constituted by a conducting coating being provided on the rear face of said front plate and covering the whole surface thereof, an eight-shaped opening for each digit of the time indication being provided in the coating constituting said transparent electrode, a solid rear plate having a front face directed toward said front plate, electrodes constituted by a plurality of segments each consisting of a conducting coating being provided on said front face of the rear plate, opposite said eight-shaped openings, said segments being individually connected to said decoding means, a solid transparent intermediate plate having a front face and a rear face and arranged between said front plate and said rear plate, a transparent electrode constituted by a conducting coating being provided on each face of said intermediate plate and extending over the whole surface thereof, a first liquid crystal layer sandwiched between the rear face of said front plate and the front face of said intermediate plate, and a second liquid crystal layer sandwiched between the rear face of said intermediate plate and the front face of said rear plate.

* * * * *